(12) United States Patent
Furumiya

(10) Patent No.: US 8,072,857 B2
(45) Date of Patent: Dec. 6, 2011

(54) METHOD AND APPARATUS OF DETERMINING A RECORDING CONDITION FOR OPTICAL DISC

(75) Inventor: Shigeru Furumiya, Hyogo (JP)

(73) Assignee: Panasonic Corporation, Osaka (JP)

( * ) Notice: Subject to any disclaimer, the term of this patent is extended or adjusted under 35 U.S.C. 154(b) by 355 days.

(21) Appl. No.: 12/276,669

(22) Filed: Nov. 24, 2008

(65) Prior Publication Data

US 2009/0168623 A1 Jul. 2, 2009

Related U.S. Application Data

(60) Provisional application No. 60/990,310, filed on Nov. 27, 2007.

(51) Int. Cl.
*G11B 7/00* (2006.01)

(52) U.S. Cl. .................................... 369/47.53

(58) Field of Classification Search ............... 369/53.13, 369/53.2, 47.5–47.53, 116, 59.11, 53.26
See application file for complete search history.

(56) References Cited

U.S. PATENT DOCUMENTS

| | | | |
|---|---|---|---|
| 6,975,572 B2 * | 12/2005 | Matsumoto | 369/47.53 |
| 7,099,251 B2 * | 8/2006 | Naoi et al. | 369/53.13 |
| 2002/0003760 A1 * | 1/2002 | Honda | 369/47.53 |
| 2002/0176338 A1 | 11/2002 | Ushiyama et al. | |
| 2005/0094518 A1 * | 5/2005 | Ueki | 369/47.53 |
| 2005/0147001 A1 * | 7/2005 | Takahashi | 369/47.5 |

FOREIGN PATENT DOCUMENTS

JP 2002-352430 12/2002

OTHER PUBLICATIONS

Blu-ray Disc Reader, published by Ohmsha, Ltd., pp. 13-28 with a concise explanation.
White paper, Blu-ray Disc Format, General, Aug. 2004, pp. 1-37.
White paper, Blu-ray Disc Format, 3. File System Specifications for BD-RE, R, ROM, Aug. 2004, pp. 1-6.
White paper, Blu-ray Disc Format, 4. Key Technologies, Aug. 2004, pp. 1-8.

* cited by examiner

*Primary Examiner* — Thang Tran
(74) *Attorney, Agent, or Firm* — Renner, Otto, Boisselle & Sklar, LLP

(57) ABSTRACT

An optical disc writing condition determining method according to the present invention includes the steps of: performing a first test write operation at a low speed on an inner test track; setting condition A for performing a write operation at the low speed on the inner test track based on a result of the first test write operation; performing a second test write operation at the low speed on an outer test track; setting condition B for performing a write operation at the low speed on the outer test track based on a result of the second test write operation; performing a third test write operation at a high speed on the outer test track; setting condition C for performing a write operation at the high speed on the outer test track based on a result of the third test write operation; and calculating either a difference between the conditions A and B or a ratio of the condition B to the condition A and modifying the condition C based on the difference or the ratio, thereby determining writing condition D for performing a write operation at the high speed on user data tracks.

7 Claims, 3 Drawing Sheets

METHOD AND APPARATUS OF DETERMINING A RECORDING CONDITION FOR OPTICAL DISC

BACKGROUND OF THE INVENTION

1. Field of the Invention

The present invention relates to a method and apparatus for determining a condition for performing a write operation on an optical disc that is specially designed to perform a write operation thereon at high speeds.

2. Description of the Related Art

Examples of optical discs, from/on which data can be read and/or written optically, include write-once discs such as CD-Rs, DVD-Rs and BD-Rs to which data can be just added and rewritable discs such as DVD-RWs, DVD-RAMs and BD-REs on which data stored is rewritable. For any of these various types of optical discs, a standard writing speed is defined. Specifically, such a writing speed is represented by either a linear velocity or a transfer rate. In this description, the writing speed will be represented by the linear velocity in most cases.

At an increasing demand in the market and thanks to the development of technologies, the highest writing speed on optical discs has been rising these days. And a 16× write operation has already been realized for DVD-Rs as a result. As for BD-Rs, discs and recorders that achieve 4× recording are now under development. As used herein, the "×" means that the highest writing speed is  times as high as the standard writing speed.

To increase the writing speed, the recorder needs to not only rotate a given optical disc at higher velocities but also increase the recording power of a laser beam pulse to be applied during the write operation and the signal modulation rate as well. Also, before a write operation is actually performed at such a high speed, the best writing conditions for that writing speed are normally determined by performing a tentative write operation (which will be referred to herein as a "test write operation") on the given optical disc. That is why on an optical disc, areas for performing such a test write operation are provided inside and outside of the user data storage area of the optical disc.

FIG. 4 schematically illustrates a normal track layout for an optical disc 100. As shown in FIG. 4, the optical disc 100 has user data tracks 102 to write user data thereon, an inner test track 101 arranged inside of the user data tracks 102, and an outer test track 103 arranged outside of the user data tracks 102. Data can be either just added once, or rewritten a number of times, on the inner and outer test tracks 101 and 103 and the test write operation is performed on these tracks to determine the data writing conditions.

For example, Japanese Patent Application Laid-Open Publication No. 2002-352430 discloses a conventional method and apparatus for determining conditions for a high-speed write operation. More specifically, that patent document discloses a method for determining the best writing conditions for the writing speed on user data tracks based on results of test write operations that have been performed at multiple different writing speeds on the outer area of the optical disc. The document also discloses a method of correcting the dependence on a radial location on the disc by making an interpolation based on results of test write operations on the inner and outer areas.

If a high-speed write operation is performed on a normal optical disc with a thickness of 1.2 mm and a diameter of 12 cm, the optical disc is preferably used at a rotational velocity of approximately 10,000 rpm or less, considering the maximum rotation performance of the spindle motor, noise, and precaution against possible rupture of the disc. Also, if the optical disc is rotated at a constant rotational velocity, the write linear velocity on the innermost area with the smallest radius is lower than the one on the outermost area with the largest radius. For that reason, if a test write operation is performed on the inner test track with the smallest radius, it is difficult to perform the test write operation at a high speed due to the limit of the rotational velocity. More specifically, on a BD, for example, if the writing speed is 5×, the rotational velocity in the vicinity of the innermost radius of 22 mm reaches as high as approximately 10,000 rpm. That is to say, the rotational velocity on the inner test track becomes too high to perform a test write operation on it easily at a speed of 6× or even higher speeds.

According to the method disclosed in Japanese Patent Application Laid-Open Publication No. 2002-352430, the outer test track that enables a high-speed write operation is used for test writing. And such a method is effective only when the rotational velocity is relatively low. It is also effective if the distribution of write properties from the innermost area of the disc through the outermost area thereof is already known. However, if the relation between the write property on the outer test track and the one on the inner test track or the user data tracks were an unexpected one, writing conditions that could result in greater errors could be obtained unintentionally.

An example of such an awkward situation will be described with reference to FIGS. 5A and 5B, which show how the best recording power changes according to the radial location of a write track in a situation where the writing speed on a certain optical disc is set to be constant. Ideally, the best recording power on an optical disc should be constant irrespective of the radial location. Actually, however, a real optical disc has some property varying according to the radial location. For example, the thickness of the recording film thereof may increase monotonically in the radial direction. In that case, the recording power $1d$ that has been obtained by making an interpolation between the recording power $1a$ on the inner test track 101 and the recording power $1b$ on the outer test track 103 agrees with the actual recording power $1c$ on the user data tracks 102 as shown in FIG. 5A.

However, the write property could vary distinctly on the outer area of an optical disc, for example. More specifically, the coating layer or the recording film could become extremely thin around the outermost area of a disc. In that case, the recording power $2d$ that has been obtained by making an interpolation between the recording power $2a$ on the inner test track 101 and the recording power $2b$ on the outer test track 103 would disagree with the actual recording power $2c$ on the user data tracks 102 as shown in FIG. 5B, which is a problem.

Such a problem arises because the conventional method is based on a supposition that any variation occurring on an optical disc in the radial direction should be able to be approximated linearly, for example. That is why if a property of an optical disc varied distinctly on the outer test track 103, then the property on the user data tracks 102 would be unpredictable even by performing a test write operation on the outer test track 103. For that reason, if data is going to be added to an optical disc on which another set of data has already been written through a middle portion of the user data tracks 102, then the conditions for such a write operation to be started at the middle portion cannot be determined properly. That is to say, according to the method of Japanese Patent Application Laid-Open Publication No. 2002-352430, it is very difficult to predict properly high-speed writing conditions at such a middle portion.

On top of that, since the outer test track 103 of an optical disc is located outside of the user data tracks 102 thereof, no read/write property could be defined for that track 103 in the specification of a product. That is why even an optical disc that has been shipped as a good product may have a different property on the outer test track 103 from the ones on the inner test track 101 and the user data tracks 102. Such a radial distribution of properties on an optical disc may be produced due to a variation during the manufacturing process, for example. And the distribution can also be produced due to a difference in the method of making the recording film. For example, the recording film could be formed by performing either a spin coating process of an organic recording film or a sputtering process of an inorganic recording film on the optical disc.

SUMMARY OF THE INVENTION

In order to overcome the problems described above, the present invention has an object of providing a method and apparatus for determining a condition for performing a write operation on an optical disc that is specially designed to perform a write operation thereon at high speeds even if a high-speed test write operation cannot be performed on the inner test track thereof or if the relation between the property on the outer test track and the one on the user data tracks is unknown.

A method for determining a condition for performing a write operation on an optical disc according to the present invention includes the steps of: performing a first test write operation at a low speed on an inner test track; setting writing condition A for performing a write operation at the low speed on the inner test track based on a result of the first test write operation; performing a second test write operation at the low speed on an outer test track; setting writing condition B for performing a write operation at the low speed on the outer test track based on a result of the second test write operation; performing a third test write operation at a high speed on the outer test track; setting writing condition C for performing a write operation at the high speed on the outer test track based on a result of the third test write operation; and calculating either a difference between the writing conditions A and B or a ratio of the writing condition B to the writing condition A and modifying the writing condition C based on the difference or the ratio, thereby determining writing condition D for performing a write operation at the high speed on user data tracks.

Another method for determining a condition for performing a write operation on an optical disc according to the present invention includes the steps of: performing a first test write operation at a low speed on an inner test track; setting writing condition A for performing a write operation at the low speed on the inner test track based on a result of the first test write operation; performing a second test write operation at the low speed on an outer test track; setting writing condition B for performing a write operation at the low speed on the outer test track based on a result of the second test write operation; performing a third test write operation at a high speed on the outer test track; setting writing condition C for performing a write operation at the high speed on the outer test track based on a result of the third test write operation; and calculating either a difference between the writing conditions A and B or a ratio of the writing condition B to the writing condition A and defining the writing condition C to be writing condition D for performing a write operation at the high speed on user data tracks if the difference or the ratio is equal to or smaller than a predetermined value or modifying the writing condition C based on the difference or the ratio if the difference or the ratio is greater than the predetermined value, thereby determining the writing condition D.

In one preferred embodiment, the high speed at which the third test write operation is performed on the outer test track is even higher than the highest speed of a write operation that is possibly performed on the inner test track.

In another preferred embodiment, the writing conditions A through D include at least a condition on the recording power of a light beam.

An apparatus for determining a condition for performing a write operation on an optical disc according to the present invention includes: a disc motor for rotating an optical disc mounted thereon at high and low velocities; an optical head, which includes a light source, writes data by irradiating the disc with a light beam that has been emitted from the light source, and generates a read signal by detecting light reflected from the disc; a traverse mechanism for moving the optical head along the radius of the disc such that the light beam that has gone out of the optical head reaches inner and outer test tracks of the disc; a read signal processing section for detecting a characteristic of the read signal; a write signal processing section for generating a test write signal and outputting the test write signal to the optical head; and a control section. The control section controls the disc motor, the optical head, the traverse mechanism, the read signal processing section and the write signal processing section in accordance with one of the methods of the present invention described above, thereby determining writing condition for performing a write operation at the high speed on user data tracks.

According to the optical disc read/write method of the present invention, even if it is difficult to perform a high-speed test write operation on the inner test track or if the relation between the property on the outer test track and the one on the user data tracks is unknown, the best writing condition for performing such a high-speed write operation on the user data tracks can still be determined. That is why the present invention is applicable particularly effectively to a situation where the high-speed write operation should be started at a middle portion of an optical disc. As a result, such a high-speed write operation can be done using a normal recorder/player and a normal optical disc without using a recorder/player that is compatible with an optical disc to be rotated at ultrahigh velocities in the inner area thereof or an optical disc, of which the property on the outer test track has been checked out strictly.

DETAILED DESCRIPTION OF PREFERRED EMBODIMENTS

Embodiment 1

Hereinafter, a first preferred embodiment of a method and apparatus for determining a condition for performing a write operation on an optical disc according to the present invention will be described with reference to the accompanying drawings.

Figure 4:
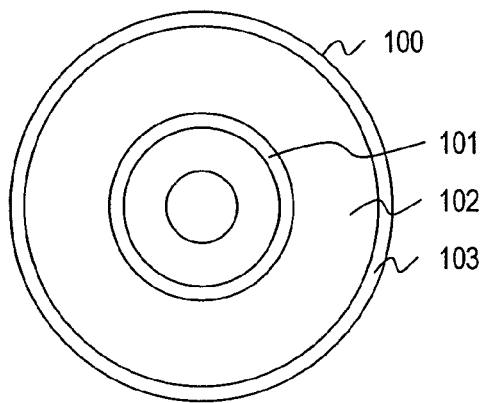
FIG. 4 is a schematic representation illustrating a format for an optical disc for use in the apparatus shown in FIG. 1.

An optical disc for use in a method and apparatus for determining a condition for performing a write operation on an optical disc according to the present invention has inner and outer test write areas on which data can be either just added once or rewritten a number of times. FIG. 4 schematically illustrates a track layout for such an optical disc 100. As shown in FIG. 4, the optical disc 100 has user data tracks 102, an inner test track 101 arranged inside of the user data tracks 102, and an outer test track 103 arranged outside of the user data tracks 102. The user data tracks 102 are tracks on which the user can write his or her desired data. That portion with these user data tracks 102 is also called a "data area".

The inner and outer test tracks 101 and 103 are used to write test data thereon and find the best recording power and the best write pulse train conditions on a disc-by-disc basis based on a result of the test write operation. Also, if the performance of the given optical disc drive is significantly different from the previous one or if any environmental variation such as a sudden temperature change has arisen, then the test tracks 101 and 103 are also used to perform a test write operation and cancel the variation in recording power or write pulse train. As long as the inner and outer test tracks 101 and 103 can perform these functions, these tracks 101 and 103 may also be called differently.

Hereinafter, preferred embodiments of the present invention will be described as being applied to a BD-R (i.e., write-once Blu-ray Disc) as an exemplary optical disc 100. However, the present invention is in no way limited to those specific preferred embodiments. Alternatively, the optical disc 100 may also be a BD-RE (i.e., a rewritable Blu-ray Disc) on which information can be rewritten a number of times or an optical disc compliant with any other standard.

Main optical constants and physical formats for BDs are disclosed in "Blu-ray Disc Reader" (published by Ohmsha, Ltd.) and on White Paper at the website of Blu-ray Association (http://www.blu-raydisc.com), for example. Specifically, the standard linear velocity (which will also be referred to herein as "reference linear velocity" or 1×) corresponding to a standard BD transfer rate (1×) is 4.9 m/sec. The 2×, 4×, 6× and 8× linear velocities are 9.8 m/sec, 19.7 m/sec, 29.5 m/sec, and 39.3 m/sec, respectively. A linear velocity higher than the standard linear velocity is normally a positive integral number of times as high as the standard linear velocity. But the factor does not have an integer but may also be a positive real number. Optionally, a linear velocity that is lower than the standard linear velocity (such as a 0.5× linear velocity) may also be defined. Consequently, writing speeds may be defined as 2×, 4× and so on, but could also be defined as 0.5×, 4.5× and so on.

As for a BD-R, a lead-in zone and a lead-out zone are respectively arranged inside and outside of the data area where the user data tracks 102 are arranged. The inner test track 101 corresponds to an OPC (optimum power control) zone in the lead-in zone. A PIC (permanent information and control data) zone 1003 is also included in the lead-in zone. The PIC zone is a read-only area, in which parameters to define the recommended recording power, the recommended write pulse train width, the write linear velocity, read conditions and other parameters are stored. On the other hand, the outer test track 103 corresponds to a DCZ (drive calibration zone) or protection zone that is arranged in the lead-out zone.

In a BD-R, these zones cover the following radial ranges as measured from the center of the disc. Specifically, the lead-in zone covers the radial range of 22.2 mm through 24.0 mm, the data area covers the range of 24.0 mm through 58.0 mm, and the lead-out zone covers the range of 58.0 mm through 58.5 mm.

Figure 1:
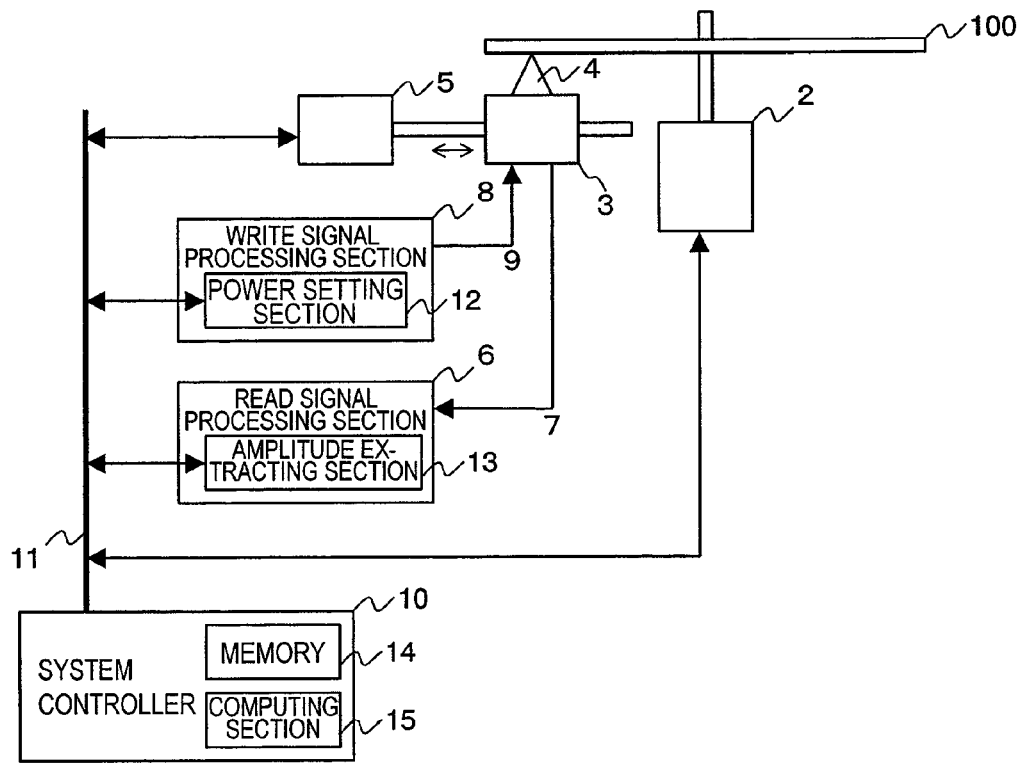
FIG. 1 is a block diagram illustrating a preferred embodiment of an apparatus for determining a condition for performing a write operation on an optical disc according to the present invention.

FIG. 1 is a block diagram illustrating a preferred embodiment of an apparatus for determining a condition for performing a write operation on an optical disc according to the present invention. The apparatus shown in FIG. 1 includes an optical disc motor 2, an optical head 3, a traverse mechanism 5, a read signal processing section 6, a write signal processing section 8, and a system controller 10 functioning as a control section. The system controller 10 includes a memory 14 and a computing section 15, and receives various sorts of information from the respective components, and controls those components, through a control bus 11.

The optical disc motor 2 mounts a given optical disc 100 thereon and rotates the optical disc 100 at a predetermined rotational velocity in accordance with an instruction given by the system controller 10.

The optical head 3 includes a light source and irradiates the optical disc 100 with a light beam 4 that has been emitted from the light source, thereby writing data on the disc. In performing a read operation, the optical head 3 also irradiates the optical disc 100 with the light beam 4, and detects reflected light that has been modulated by marks and spaces on the optical disc 100, thereby generating a read signal.

The traverse mechanism 5 moves the optical head 3 along the radius of the optical disc 100 such that a target track of the read/write operation is irradiated with the light beam 4.

The read signal processing section 6 detects the characteristics of the read signal 7 supplied from the optical head 3. More particularly, the read signal processing section 6 includes an amplitude extracting section 13 for detecting the amplitude of the read signal 7.

The write signal processing section 8 generates a test write signal 9 and outputs it to the optical head 3. More particularly, the write signal processing section 8 includes a power setting section 12 for setting the power of the test write signal 9.

The optical disc writing condition determining apparatus of the present invention is preferably built in an optical disc drive for reading and writing data from/on the optical disc 100. That is why the respective component described above may also be used to write user data on the optical disc 100 and read the data stored on the optical disc 100. Also, to read and write the user data, the apparatus of the present invention may further include additional components other than the ones described above. In other words, the present invention may also be implemented as an optical disc drive that includes the components described above and that can read/write user data.

Even if the given optical disc is being rotated at such a rotational velocity at which it is either impossible, or at least inappropriate, to perform a high-speed test write operation on the inner test track, an optical disc writing condition determining apparatus according to the present invention can also determine the writing condition for performing such a high-speed write operation on user data tracks based on a result obtained at a low speed from the inner test track and results obtained at low and high speeds from the outer test track.

Hereinafter, an optical disc writing condition determining process to be carried out by the optical disc writing condition determining apparatus of the present invention will be described in detail. The respective procedures of that process may be stored as a computer readable program (i.e., as a piece of firmware) on an information storage medium such as an EEPROM or a RAM included in the system controller 10. The system controller 10 reads such a program defining those procedures and controls the respective components following those procedures.

In the following description, the "low speed" means a predetermined writing speed or a predetermined linear velocity, while the "high speed" means a writing speed or a linear velocity that is higher than the predetermined one. Also, the "high speed" is preferably a writing speed that is even higher than the highest possible writing speed on the inner test track 101. For example, the "low speed" may be 4× writing speed on the optical disc 100 and the "high speed" may be a higher speed than the standard writing speed on the optical disc 100 (e.g., 8× writing speed). The distance to go for a light beam to make one round of the optical disc 100 changes according to the radial location on the disc 100. That is why even if the writing speed or linear velocity remains 4×, the rotational velocity of the optical disc 100 to achieve that writing speed varies according to the radial location.

Step 1

Get the optical head 3 moved by the traverse mechanism 5 such that the light beam 4 that has gone out of the optical head 3 reaches the inner test track 101 on the optical disc 100. Also, get the optical disc 100 turned by the disc motor 2 such that the writing speed becomes low on the inner test track 101.

Step 2

Perform a first test write operation at the low speed on the inner test track 101 while getting the writing conditions changed by the power setting section 12 in the write signal processing section 8. For example, perform the first test write operation while changing the recording powers stepwise in the order of Pw1, Pw2, Pw3, Pw4 and Pw5 (where Pw1<Pw2<Pw3<Pw4<Pw5). As the first test write pattern, a repetitive pattern including a 2 T signal representing the shortest mark and an 8 T signal representing the longest mark may be used so as to detect both the degree of asymmetry and the degree of modulation at the same time.

Step 3

Scan the inner test track 101 on which the first test write operation has been performed at the low speed and get information about the amplitude of the read signal 7 using the amplitude extracting section 13 of the read signal processing section 6. More specifically, the recording marks that have been left on the inner test track 101 are read with five different recording powers, thereby generating read signals 7 associated with the five recording powers. Then, the degrees of modulation and asymmetry of the respective read signals 7 are calculated and temporarily stored in the memory 14 in the system controller 10.

Figure 2:
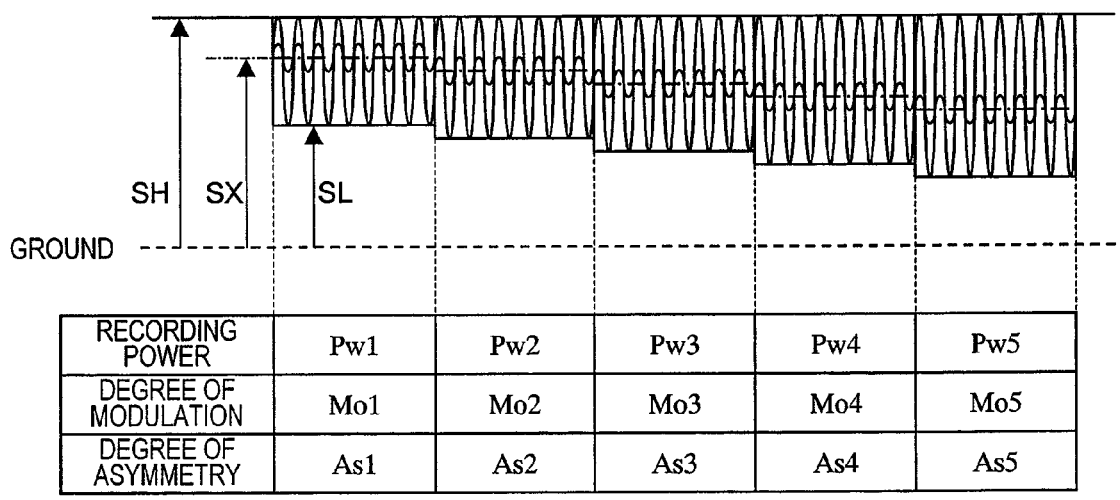
FIG. 2 shows the waveforms of read signals that have been generated from a track on which the apparatus shown in FIG. 1 has performed a test write operation.

FIG. 2 shows examples of read signals that have been generated in a situation where the first test write operation has been performed with the recording powers Pw1, Pw2, Pw3, Pw4 and Pw5. Supposing the upper, lower and zero-cross levels of a read signal associated with each of those recording powers are represented by SH, SL and SX, respectively, the degrees of modulation Mo and asymmetry As are respectively defined by the following Equations (1) and (2):

$$Mo=(SH-SL)/SH \quad (1)$$

$$As=\{(SH+SL)/2-SX\}/(SH-SL) \quad (2)$$

As shown in FIG. 2, the degrees of modulation Mo and asymmetry As of the read signals on which the first test write operation has been performed with the recording powers Pw1, Pw2, Pw3, Pw4 and Pw5 are represented by Mo1, Mo2, Mo3, Mo4 and Mo5 and As1, As2, As3, As4 and As5, respectively.

Step 4

Determine writing condition A for performing a write operation at the low speed on the inner test track 101 based on a result of the first test write operation, i.e., the characteristic of the read signal generated as a result of the test write operation. More specifically, make the computing section 15 of the system controller 10 calculate a recording power, with which the target value or the recommended value of the read signal amplitude information is obtained, based on the information about the amplitude of the read signal 7 that is temporarily stored in the memory 14, and then store it as the best writing condition A for performing a write operation at the low speed on the inner test track 101 in the memory 14.

Figure 3A:
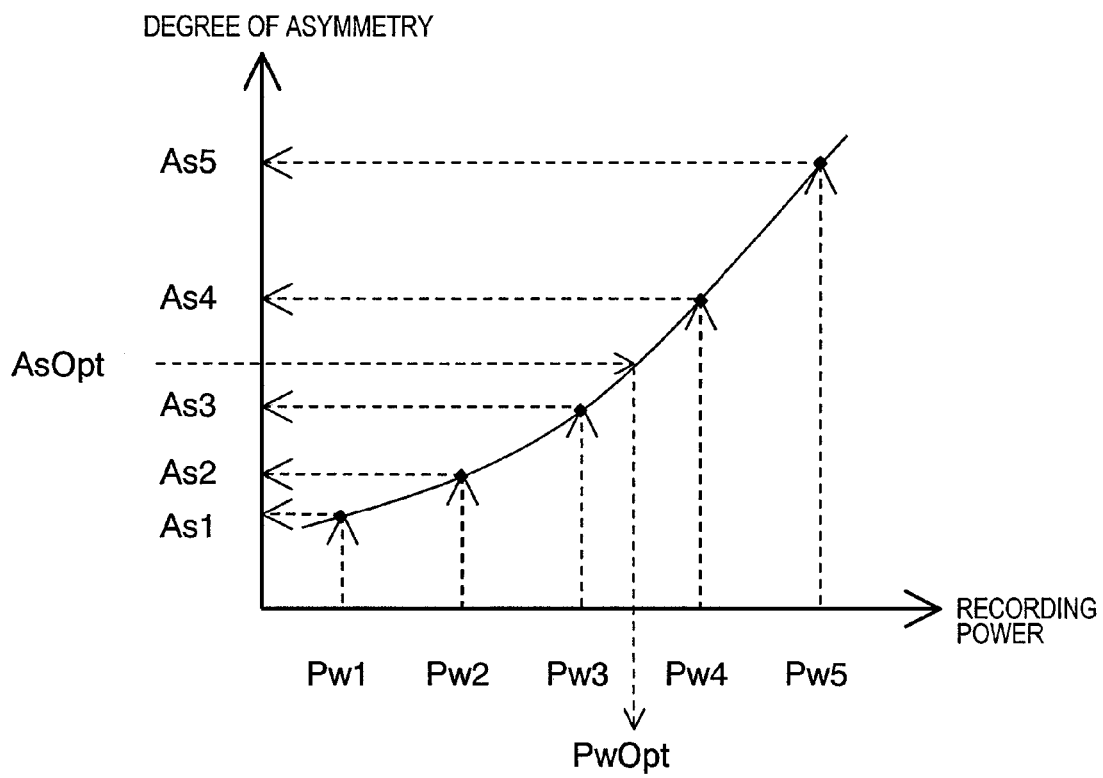
FIG. 3A shows how the apparatus shown in FIG. 1 determines the optimum recording power by the degree of asymmetry that has been obtained as a result of a test write operation.

For example, by using the degrees of asymmetry As1, As2, As3, As4 and As5 that are associated with the recording powers Pw1, Pw2, Pw3, Pw4 and Pw5 as shown in FIG. 3A, an approximation function that uses a degree of asymmetry as a function of a recording power is obtained by interpolation or minimum square method. If the recommended value AsOpt of the degree of asymmetry is stored in the PIC zone of the optical disc 100, the optimum recording power PwOpt associated with the recommended value AsOpt is calculated by the approximation function thus obtained.

Figure 3B:
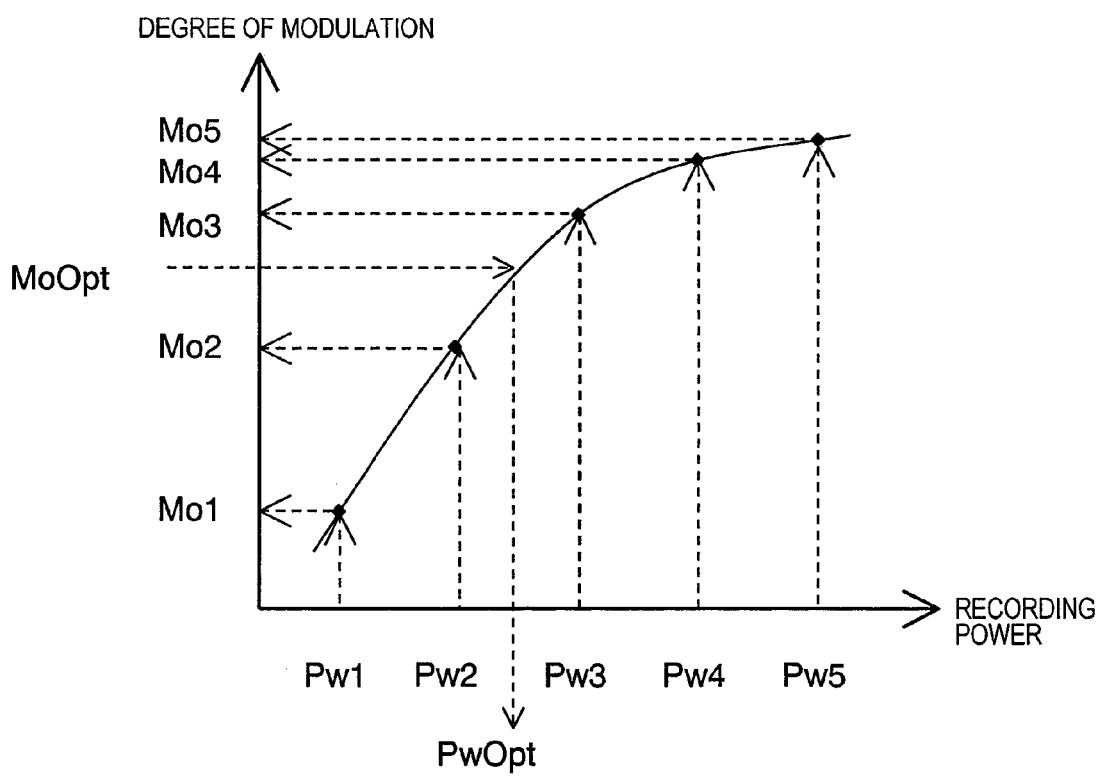
FIG. 3B shows how the apparatus shown in FIG. 1 determines the optimum recording power by the degree of modulation that has been obtained as a result of a test write operation.

In the same way, by using the degrees of modulation Mo1, Mo2, Mo3, Mo4 and Mo5 that are associated with the recording powers Pw1, Pw2, Pw3, Pw4 and Pw5 as shown in FIG. 3B, an approximation function that uses a degree of modulation as a function of a recording power is obtained by interpolation or minimum square method. If the recommended value MoOpt of the degree of modulation is stored in the PIC zone of the optical disc 100, the optimum recording power PwOpt associated with the recommended value MoOpt is calculated by the approximation function thus obtained.

It depends on the specifications of an optical disc drive, including an optical disc writing condition determining apparatus according to this preferred embodiment, or those of the optical disc 100, which of these two optimum recording powers PwOpt that have been obtained based on the recommended values AsOpt and MoOpt of the degrees of asymmetry and modulation should be defined as the writing condition A and written on the optical disc 100. In any case, the optimum recording power PwOpt that has been determined in this manner is stored as the writing condition A in the memory 14.

Step 5

Get the optical head 3 moved by the traverse mechanism 5 such that the light beam 4 that has gone out of the optical head 3 reaches the outer test track 103 on the optical disc 100. Also, get the optical disc 100 turned by the disc motor 2 such that the writing speed becomes low on the outer test track 103.

Step 6

Perform a second test write operation at the low speed on the outer test track 103 while getting the writing conditions changed by the power setting section 12 in the write signal processing section 8. The same test write patterns and the same five different recording powers as the ones used in Step 2 may also be used in this step.

Step 7

Scan the outer test track 103 on which the second test write operation has been performed at the low speed and get information about the amplitude of the read signal 7 using the amplitude extracting section 13 of the read signal processing section 6. More specifically, as in Step 3, the recording marks that have been left on the outer test track 103 are read with five different recording powers, thereby generating read signals 7 associated with the five recording powers. Then, the degrees of modulation and asymmetry of the respective read signals 7 are calculated and temporarily stored in the memory 14 in the system controller 10.

Step 8

Determine writing condition B for performing a write operation at the low speed on the outer test track 103 based on a result of the second test write operation, i.e., the characteristic of the read signal generated as a result of the test write operation. More specifically, make the computing section 15 of the system controller 10 calculate a recording power, with which the target value of the read signal amplitude information is obtained, based on the information about the amplitude of the read signal 7 that is temporarily stored in the memory 14, and then store it as the best writing condition B for performing a write operation at the low speed on the outer test track 103 in the memory 14.

Step 9

Get the optical head 3 held at the same position such that the light beam 4 continues to irradiate the outer test track 103 on the optical disc 100. Also, get the optical disc 100 turned by the disc motor 2 such that the writing speed becomes high on the outer test track 103.

Step 10

Perform a third test write operation at the high speed on the outer test track 103 while getting the writing conditions changed by the power setting section 12 in the write signal processing section 8. The same test write patterns and the same five different recording powers as the ones used in Step 2 may also be used in this step.

Step 11

Scan the outer test track 103 on which the third test write operation has been performed at the high speed and get information about the amplitude of the read signal 7 using the amplitude extracting section 13 of the read signal processing section 6. More specifically, as in Step 3, the recording marks that have been left on the outer test track 103 are read with five different recording powers, thereby generating read signals 7 associated with the five recording powers. Then, the degrees of modulation and asymmetry of the respective read signals 7 are calculated and temporarily stored in the memory 14 in the system controller 10.

Step 12

Determine writing condition C for performing a write operation at the high speed on the outer test track 103 based on a result of the third test write operation, i.e., the characteristic of the read signal generated as a result of the test write operation. More specifically, make the computing section 15 of the system controller 10 calculate a recording power, with which the target value of the read signal amplitude information is obtained, based on the information about the amplitude of the read signal 7 that is temporarily stored in the memory 14, and then store it as the best writing condition C for performing a write operation at the high speed on the outer test track 103 in the memory 14.

Step 13

Calculate either the difference between the writing conditions A and B or the ratio of the writing condition B to the writing condition A and modify the writing condition C based on the difference or the ratio, thereby determining writing condition D for performing a write operation at the high speed on the user data tracks 102. In this preferred embodiment, using the writing conditions A, B and C that are stored in the memory 14, the computing section 15 calculates the difference between the writing conditions A and B and modifies the writing condition C with the difference as represented by the following Equation (3), thereby determining writing condition D and storing it in the memory 14.

$$\text{Writing condition } D = \text{writing condition } C + (\text{writing condition } A - \text{writing condition } B) \quad (3)$$

The writing condition D that has been obtained in this manner is a writing condition to adopt if a test write operation can be performed at a high speed on the inner test track 101.

Figure 5A:
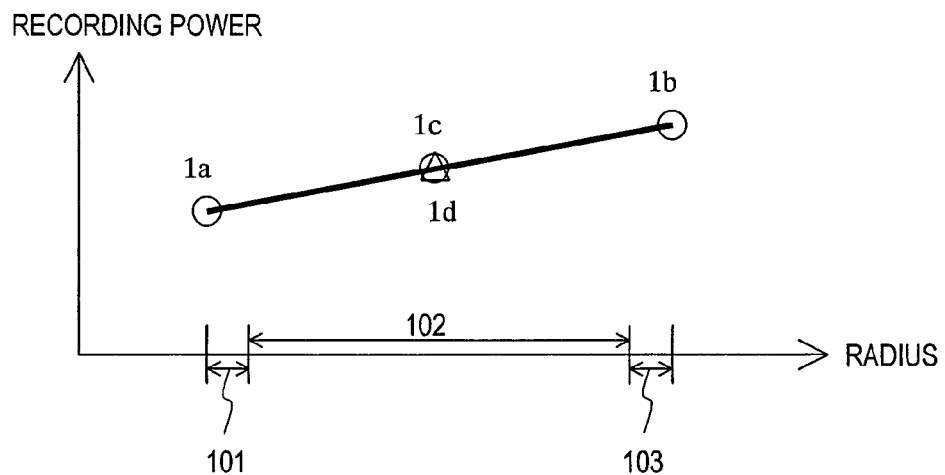
FIG. 5A shows a conventional technique for determining a condition for performing a write operation on an optical disc.
Figure 5B:
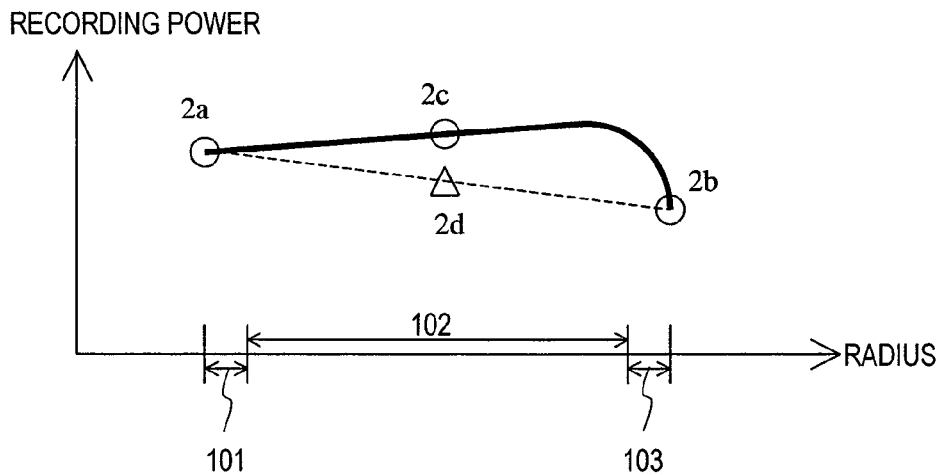
FIG. 5B shows another conventional technique for determining a condition for performing a write operation on an optical disc.

As already described with reference to FIG. 5A, if the distribution of write properties from the innermost area of the optical disc 100 through the outermost area thereof is already known (particularly if the distribution of the properties varies monotonically), then the writing condition D that has been set in this manner may be estimated to be the condition for performing a write operation at the high speed on the inner test track 101. And the condition for performing a write operation on the user data tracks 102 may be obtained by making an interpolation between the writing condition C for performing a write operation at the high speed on the outer test track 103, which has been obtained based on actual measurements, and the writing condition D that has been calculated. However, as already described with reference to FIG. 5B, if the write property might vary distinctly on the outer area of the optical disc 100, it is preferred that the condition for performing a write operation on the user data tracks 102 not be obtained based on the writing conditions C and D.

That is why according to this preferred embodiment, the writing condition D is defined to be the condition for performing a write operation at the high speed on the user data tracks 102. For the same reason, the writing condition A for performing a write operation at the low speed on the inner test track 101 is adopted as the condition for performing a write operation at the low speed on the user data tracks 102.

As described above, the write property might vary distinctly on the outer area of the optical disc 100. For that reason, the writing conditions B and C for performing a write operation at the low and high speeds on the outer test track 103, which have been obtained based on actual measurements, could be inaccurate. Even so, the difference between these writing conditions B and C would represent substantially accurately the difference in write property between the high- and low-speed write operations. That is why by determining the conditions for performing a write operation at low and high speeds on the user data tracks 102 as described above, recording marks of an appropriate shape can be left on the user data tracks 102. Consequently, optical disc writing conditions contributing to producing a read signal of quality can be obtained. The following Table 1 summarizes the relations between the writing speed and the writing conditions according to this preferred embodiment:

TABLE 1

| Writing speed | Writing conditions | | |
| --- | --- | --- | --- |
| | Inner test track | User data tracks | Outer test track |
| High-speed writing | — | D = C + (A − B) | C |
| Low-speed writing | A | A | B |

If the optical disc 100 is a BD-R, a track in the OPC zone, which is arranged around a radial location of 23 mm, is used as the inner test track 101 as described above. Also, either a track in the DCZ zone, which is arranged around a radial location of 58 mm, or a protection zone, which is located outside of the DCZ zone and reaches a radial location of 58.5 mm, is used as the outer test track 103.

In Steps 1 through 4, the optical disc 100 is rotated at a rotational velocity of approximately 8,200 rpm so that the writing speed on the inner test track 101 will be low, e.g., 4× writing speed. Next, in Steps 5 through 8, the optical disc 100 is rotated at a rotational velocity of approximately 3,200 rpm so that the writing speed on the outer test track 103 will be low, e.g., 4× writing speed, again. And then in Steps 9 through 12, the optical disc 100 is rotated at a rotational velocity of approximately 6,400 rpm so that the writing speed on the outer test track 103 will be high, e.g., 8× writing speed.

By performing the test write operations at such rotational velocities, the writing conditions A, B and C are determined based on results of the test write operations. And the writing condition D is determined by making a calculation on the writing conditions A, B and C.

If a write operation is performed at 4× speed on the user data tracks 102, the writing condition A is adopted. However, if a write operation were performed at 8× speed on the inner test track, the rotational velocity would be as high as 16,000 rpm, which is way too high to set a writing condition normally. According to this preferred embodiment, however, even if the write property varies distinctly on the outer test track 103, the best writing condition D for performing an 8× speed write operation can still be estimated properly. As a result, in the outer area where the rotational velocity at the 8× writing speed becomes equal to or lower than 10,000 rpm (i.e., on the user data tracks 102 outside of the radial location of 37 mm), the writing condition D thus obtained can be used as the condition for writing data at the 8× writing speed.

As described above, according to this preferred embodiment, test write operations are performed at the high and low speeds on the outer test track, thereby setting conditions for performing write operations at the high and low speeds on the outer test track. Even if the write property on the outer test track varies differently from the other tracks, the difference between the writing conditions corresponding to the difference between the two speeds is exactly proportional to the difference in writing condition between the high and low speeds. For that reason, if the writing condition for performing a write operation at the low speed on the inner test track, which has been determined as a result of the test write operation, is modified with the difference between the high- and low-speed writing conditions, the writing condition for performing a write operation at the high speed on the inner test track can be estimated appropriately.

That is why even if it is difficult to perform a test write operation at the high speed on the inner test track and even if the relation between the characteristic of the outer test track and that of the user data tracks is unknown, the best writing condition for performing a write operation at the high speed on the user data tracks can still be obtained. Therefore, the present invention can be used particularly effectively in a situation where a high-speed write operation needs to be started at a middle of a given optical disc. Consequently, such a high-speed write operation can be done using a normal recorder/player and a normal optical disc without using a recorder/player that is compatible with an optical disc to be rotated at ultrahigh velocities in the inner area thereof or an optical disc, of which the property on the outer test track has been checked out strictly.

Embodiment 2

Hereinafter, a second preferred embodiment of a method and apparatus for determining a condition for performing a write operation on an optical disc according to the present invention will be described with reference to the accompanying drawings. The optical disc writing condition determining apparatus of this preferred embodiment has the same configuration as the counterpart of the first preferred embodiment described above. And only the optical disc writing condition determining process to be carried out by that apparatus is different from that of the first preferred embodiment. More particularly, only Step 13 is different from that of the first preferred embodiment. Thus, the following description will be focused on the difference from the first preferred embodiment.

First, Steps 1 through 12 of the first preferred embodiment are carried out, the writing conditions A, B and C are set based on results of the first, second, and third test write operations, and those conditions are stored in the memory 14. After that, Step 13 is carried out.

Step 13

Get the ratio of the writing condition B to the writing condition A calculated as represented by the following Equation (4) by the computing section 15 using the writing conditions A, B and C that are stored in the memory 14, and then modify the writing condition C with that ratio, thereby determining writing condition D and store it in the memory 14:

Writing condition $D$ = writing condition $C$ × (writing condition $A$ ÷ writing condition $B$)     (4)

The writing condition D that has been determined in this manner is defined to be the best writing condition for performing a write operation at the high speed on the user data tracks 102. The following Table 2 summarizes the relation between the writing speed and the writing conditions according to this preferred embodiment:

TABLE 2

| Writing speed | Writing conditions | | |
|---|---|---|---|
| | Inner test track | User data tracks | Outer test track |
| High-speed writing | — | D = C × (A ÷ B) | C |
| Low-speed writing | A | A | B |

As described above, according to this preferred embodiment, test write operations are performed at the high and low speeds on the outer test track, thereby setting conditions for performing write operations at the high and low speeds on the outer test track. Even if the write property on the outer test track varies differently from the other tracks, the ratio of the writing conditions corresponding to the difference between the two speeds is exactly proportional to the ratio of the writing conditions at the high and low speeds. For that reason, if the writing condition for performing a write operation at the low-speed on the inner test track, which has been determined as a result of the test write operation, is modified with the ratio between the high- and low-speed writing conditions, the writing condition for performing a write operation at the high speed on the inner test track can be estimated appropriately. Consequently, the same effects as those of the first preferred embodiment are also achieved by this preferred embodiment.

Embodiment 3

Hereinafter, a third preferred embodiment of a method and apparatus for determining a condition for performing a write operation on an optical disc according to the present invention will be described with reference to the accompanying drawings. The optical disc writing condition determining apparatus of this preferred embodiment also has the same configuration as the counterpart of the first preferred embodiment described above. And only the optical disc writing condition determining process to be carried out by that apparatus is different from that of the first preferred embodiment. More particularly, only Step 13 is different from that of the first preferred embodiment. Thus, the following description will be focused on the difference from the first preferred embodiment.

First, Steps 1 through 12 of the first preferred embodiment are carried out, the writing conditions A, B and C are set based on results of the first, second, and third test write operations, and those conditions are stored in the memory 14. After that, Step 13 is carried out.

Step 13

Get either the difference between the writing conditions A and B or the ratio of the writing condition B to the writing condition A calculated by the computing section 15 using the writing conditions A, B and C that are stored in the memory 14. If the difference or the ratio is equal to or smaller than a predetermined value, then it means that the writing conditions A and B are substantially equal to each other and that the write property is uniform from the innermost area of the disc through the outermost area thereof.

That is why the best writing condition C for performing a write operation at the high speed on the outer test track 103 is estimated to be equal to the best writing condition for performing a write operation at the high speed on the inner test track 101. Consequently, in that case, the best writing condition D for performing a write operation at the high speed on the user data tracks may be the same as the writing condition C.

On the other hand, if the difference or the ratio is greater than the predetermined value, then the write property is not uniform from the innermost area of the disc through the outermost area thereof, and therefore the write property on the outer test track 103 is different from the one on the inner test track 101. For that reason, as already described for the first and second preferred embodiments, the writing condition D calculated by Equation (3) or (4) is defined to be the best writing condition for performing a write operation at the high speed on the user data tracks.

However, if the difference or the ratio of the recording powers is within the range of ±5%, then the reading or write property will not be affected significantly. Also, if the difference or the ratio is smaller than a predetermined value, the writing condition D may be the same as the writing condition C. On the other hand, if the difference or the ratio is equal to or greater than the predetermined value, the writing condition D that has been set by Equation (3) or (4) may be defined as the best writing condition for performing a write operation at the high speed on the user data tracks.

The writing condition D that has been determined in this manner is defined to be the best writing condition for performing a write operation at the high speed on the user data tracks 102. The following Table 3 summarizes the relation between the writing speed and the writing conditions according to this preferred embodiment:

TABLE 3

| Writing speed | Writing conditions | | |
|---|---|---|---|
| | Inner test track | User data tracks | Outer test track |
| High-speed writing | — | If A ≈ B, D = C<br>If A ≠ B,<br>D = C + (A − B) or<br>D = C × (A ÷ B) | C |
| Low-speed writing | A | A | B |

As described above, according to this preferred embodiment, by performing test write operations, the writing conditions for performing a write operation at the low speed on the inner and outer test tracks are obtained and compared to each other. If these two conditions are substantially equal to each other, then it means that the write property is uniform from the innermost area of the disc through the outermost area thereof. That is why the writing condition for performing a write operation at the high speed on the outer test track is estimated to be equal to the one for performing a write operation at the high speed on the inner test track. Consequently, the writing condition for performing a high-speed write operation on the outer test track may be defined to be the writing condition for performing a high-speed write operation on the user data tracks. On the other hand, if the writing condition for performing a low-speed write operation on the inner test track is different from the one for performing a low-speed write operation on the outer test track, then the best writing condition for performing a high-speed write operation on the inner test track is determined by the method of the first and second preferred embodiments described above. Consequently, the same effects as those of the first preferred embodiment are also achieved by this preferred embodiment.

As already described as the first through third preferred embodiments, according to the present invention, even if it is difficult to perform a high-speed test write operation on the inner test track or if the relation between the property on the outer test track and the one on the user data tracks is unknown, the best writing condition for performing such a high-speed write operation on the user data tracks can still be determined. Specifically, even if the test write operation cannot be performed at 6× or even higher writing speeds on the inner test track due to the limit of the highest possible rotational velocity when a high-speed write operation needs to be performed on a BD-R, the best writing condition for performing a write operation at 6× or even higher speeds on the user data tracks can still be determined by using the outer test track at and outside of the radial location of 58 mm where the property is apt to lose its stability.

If a huge amount of user data needs to be written at high speeds, then it is preferred that the write operation be started using the writing condition determined by the method of the present invention as an initial value and be continued with the writing status checked on a predetermined writing unit basis and with the writing conditions further modified if necessary.

Also, in the preferred embodiments described above, the writing conditions are determined by performing a low-speed test write operation on the inner test track and setting the writing condition A first, performing a low-speed test write operation on the outer test track and setting the writing condition B next, and then performing a high-speed test write operation on the outer test track and defining the writing condition C. However, these test write operations and writing condition setting steps may be performed in a different order. Optionally, only the test write operations may be performed under the three different conditions first, and then the writing conditions A, B and C may be determined.

Furthermore, in the preferred embodiments described above, the writing condition to determine is supposed to be the recording power. However, instead of, or in addition to, the recording power, a write pulse application timing may be set by performing the test write operation and defined as the writing condition. The magnitude of error can be reduced by using Equation (3) if the timing to apply a write pulse normalized with the signal window width needs to be determined but by using Equation (4) if the recording power to be defined as an energy quantity needs to be determined.

Furthermore, in the preferred embodiments described above, degrees of modulation and asymmetry are obtained as pieces of amplitude information to determine the recording power. However, the recording power may also be determined by any other characteristic. For example, the best recording power can also be determined by a method that uses the recording power and the gradient of a variation in the degree of modulation (κ method) or a method that uses the relation between the AC center level of a read signal and the slice level (β method). Even when any of these alternative methods is adopted, the same effects as the ones achieved by the preferred embodiments described above are also accomplished.

A method and apparatus for determining a condition for performing a write operation on an optical disc according to the present invention can get a high-speed write operation done easily using a normal recorder/player and an ordinary optical disc without using a recorder/player that is compatible with an optical disc to be rotated at ultrahigh velocities in the inner area thereof or an optical disc, of which the property on the outer test track has been checked out strictly. That is why the present invention is broadly applicable to any high-speed-writing type optical disc and its dedicated recorder/player that should become mainstream products in the near future.

What is claimed is:

1. A method for determining a condition for performing a write operation on an optical disc, the method comprising the steps of:
    performing a first test write operation at a low speed on an inner test track that is a write area on the optical disc arranged radially inside of user data tracks;
    setting writing condition A for performing a write operation at the low speed on the inner test track based on a result of the first test write operation;
    performing a second test write operation at the low speed on an outer test track that is a write area on the optical disc arranged radially outside of user data tracks;
    setting writing condition B for performing a write operation at the low speed on the outer test track based on a result of the second test write operation;
    performing a third test write operation at a high speed on the outer test track;
    setting writing condition C for performing a write operation at the high speed on the outer test track based on a result of the third test write operation; and
    calculating either a difference between the writing conditions A and B or a ratio of the writing condition A to the writing condition B and determining writing condition D for performing a write operation at the high speed on user data tracks by adding to the writing condition C the difference between the writing conditions A and B, or by multiplying the writing condition C by the ratio of the writing condition A to the writing condition B.

2. A method for determining a condition for performing a write operation on an optical disc, the method comprising the steps of:
    performing a first test write operation at a low speed on an inner test track that is a write area on the optical disc arranged radially inside of user data tracks;
    setting writing condition A for performing a write operation at the low speed on the inner test track based on a result of the first test write operation;
    performing a second test write operation at the low speed on an outer test track that is a write area on the optical disc arranged radially outside of user data tracks;
    setting writing condition B for performing a write operation at the low speed on the outer test track based on a result of the second test write operation;
    performing a third test write operation at a high speed on the outer test track;
    setting writing condition C for performing a write operation at the high speed on the outer test track based on a result of the third test write operation; and
    calculating either a difference between the writing conditions A and B or a ratio of the writing condition A to the writing condition B and defining the writing condition C to be writing condition D for performing a write operation at the high speed on user data tracks if the difference or the ratio is equal to or smaller than a predetermined value or if the difference or the ratio is greater than the predetermined value, thereby determining the writing condition D by adding to the writing condition C the difference between the writing conditions A and B, or by multiplying the writing condition C by the ratio of the writing condition A to the writing condition B.

3. The method of claim 2, wherein the high speed at which the third test write operation is performed on the outer test track is even higher than the highest speed of a write operation that is possibly performed on the inner test track.

4. The method of claim 2, wherein the writing conditions A through D include at least a condition on the writing power of a light beam.

5. The method of claim 1, wherein the high speed at which the third test write operation is performed on the outer test track is even higher than the highest speed of a write operation that is possibly performed on the inner test track.

6. The method of claim 1, wherein the writing conditions A through D include at least a condition on the writing power of a light beam.

7. An apparatus for determining a condition for performing a write operation on an optical disc, the apparatus comprising:
- a disc motor for rotating an optical disc mounted thereon at high and low velocities;
- an optical head, which includes a light source, writes data by irradiating the disc with a light beam that has been emitted from the light source, and generates a read signal by detecting light reflected from the disc;
- a traverse mechanism for moving the optical head along the radius of the disc such that the light beam that has gone out of the optical head reaches inner and outer test tracks of the disc;
- a read signal processing section for detecting a characteristic of the read signal;
- a write signal processing section for generating a test write signal and outputting the test write signal to the optical head; and
- a control section,
- wherein the control section controls the disc motor, the optical head, the traverse mechanism, the read signal processing section and the write signal processing section in accordance with the method of claim 1, thereby determining a condition for performing a write operation at the high speed on user data tracks.

* * * * *

UNITED STATES PATENT AND TRADEMARK OFFICE
CERTIFICATE OF CORRECTION

| | | |
|---|---|---|
| PATENT NO. | : 8,072,857 B2 | Page 1 of 1 |
| APPLICATION NO. | : 12/276669 | |
| DATED | : December 6, 2011 | |
| INVENTOR(S) | : Shigeru Furumiya | |

It is certified that error appears in the above-identified patent and that said Letters Patent is hereby corrected as shown below:

In The Claims:

Column 16, line 59, Claim 2, "thereby" should be deleted.

Signed and Sealed this
Fifth Day of June, 2012

David J. Kappos
*Director of the United States Patent and Trademark Office*